(12) United States Patent
Louzir et al.

(10) Patent No.: US 7,934,308 B2
(45) Date of Patent: May 3, 2011

(54) METHOD FOR MAKING A WAVEGUIDE MICROWAVE ANTENNA

(75) Inventors: Ali Louzir, Rennes (FR); Dominique Lo Hine Tong, Rennes (FR); Florent Averty, Rennes (FR); Christian Person, Locmaria Plouzané (FR); Jean-Philippe Coupez, Le Relecq Kerhuon (FR)

(73) Assignee: Thomson Licensing, Boulogne-Billcourt (FR)

( * ) Notice: Subject to any disclaimer, the term of this patent is extended or adjusted under 35 U.S.C. 154(b) by 299 days.

(21) Appl. No.: 10/529,934

(22) PCT Filed: Oct. 1, 2003

(86) PCT No.: PCT/FR03/50071
§ 371 (c)(1),
(2), (4) Date: Nov. 2, 2006

(87) PCT Pub. No.: WO2004/032278
PCT Pub. Date: Apr. 15, 2004

(65) Prior Publication Data
US 2007/0096986 A1    May 3, 2007

(30) Foreign Application Priority Data
Oct. 7, 2002 (FR) ...................................... 02 12411

(51) Int. Cl.
*H01P 11/00* (2006.01)
(52) U.S. Cl. ............................ 29/600; 343/786; 264/334
(58) Field of Classification Search .................... 29/600, 29/601, 830, 831; 343/876, 772, 872, 784, 343/700 MS; 264/219, 334
See application file for complete search history.

(56) References Cited

U.S. PATENT DOCUMENTS

| 3,611,396 | A |   | 10/1971 | Jones |
| 4,408,208 | A |   | 10/1983 | Dumas |
| 4,658,258 | A | * | 4/1987 | Wilson ......................... 343/786 |
| 4,897,663 | A | * | 1/1990 | Kusano et al. ................ 343/786 |
| 5,426,443 | A | * | 6/1995 | Jenness, Jr. ................ 343/781 P |
| 5,486,839 | A | * | 1/1996 | Rodeffer et al. .............. 343/786 |
| 6,020,859 | A | * | 2/2000 | Kildal .................... 343/781 CA |
| 7,030,720 | B2 | * | 4/2006 | Lo Hine Tong et al. ...... 333/208 |
| 7,034,774 | B2 | * | 4/2006 | Kuo et al. ..................... 343/909 |
| 7,064,727 | B2 | * | 6/2006 | Hirota et al. ................. 343/786 |

FOREIGN PATENT DOCUMENTS

| FR | 2773646 | 7/1999 |
| JP | 59-107607 | 6/1984 |
| JP | 60-236504 | 11/1985 |
| WO | WO 01/29924 | 4/2001 |

OTHER PUBLICATIONS

Patent Abstracts of Japan, vol. 008, No. 226, Oct. 17, 1984 and JP 59-107607.
Patent Abstracts of Japan, vol. 010, No. 095, Apr. 12, 1986 and JP 60-236504.
Search Report dated Jun. 3, 2004.

* cited by examiner

*Primary Examiner* — Minh Trinh
(74) *Attorney, Agent, or Firm* — Robert D. Shedd; Joseph J. Opalach; Brian J. Cromarty

(57) ABSTRACT

The invention concerns a method for making a waveguide microwave antenna with corrugated horn, which consists in forming the corrugations of the horn on the outer surface of a synthetic material form block followed by surface metallization of the foam block configured to produce the antenna.

2 Claims, 2 Drawing Sheets

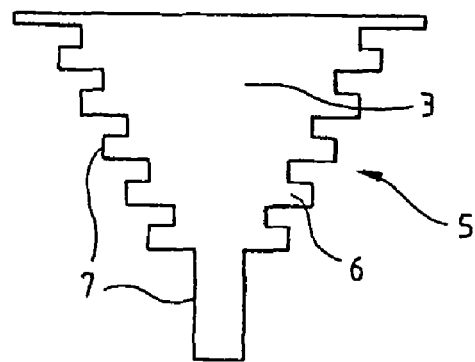
FIG.3
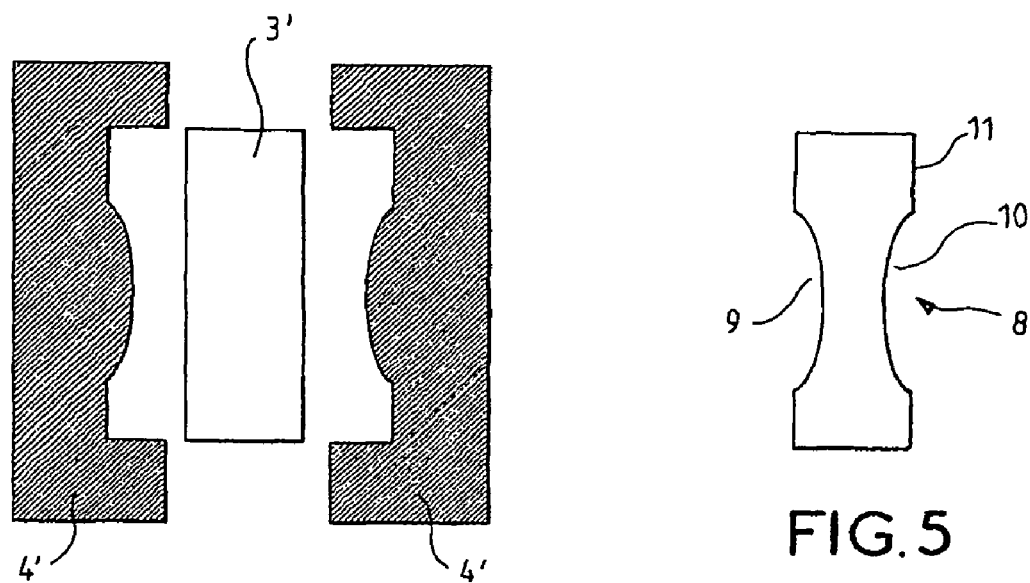
FIG.4
FIG.5
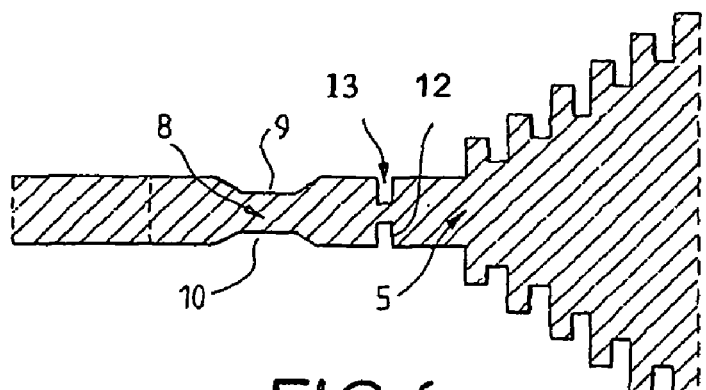
FIG.6

US 7,934,308 B2

METHOD FOR MAKING A WAVEGUIDE MICROWAVE ANTENNA

This application claims the benefit, under 35 U.S.C. §365 of International Application PCT/FR03/50071, filed Oct. 1, 2003, which was published in accordance with PCT Article 21(2) on Apr. 15, 2004 in French and which claims the benefit of French patent application No. 0212411, filed Oct. 7, 2002.

BACKGROUND OF THE INVENTION

The invention relates to a method for making for a microwave corrugated-horn antenna using waveguide technology.

This type of antenna is generally made up of several molded parts. In particular, for making the corrugated horn, the process consists in molding two half-parts that are symmetrical relative to an axial plane of the horn. The number of molds required for the manufacture of the various elements of such an antenna can become prohibitive with a view to high-volume, low-cost production. Moreover, the alignment and interconnection of the various elements of the antenna, in order to limit the electrical discontinuities, lead to manufacturing constraints that impact the production cost of the antenna.

FIG. 1 shows a perspective view of an example of a microwave antenna using waveguide technology comprising a corrugated horn 1 with, amongst other features, a frequency separator 2. The corrugated horn 1 is formed by assembly of two symmetrical half-parts.

The use of blocks of synthetic foam, such as polymethacrylimide, for constructing microwave devices using waveguide technology is known from the document "Foam technology for integration of microwave 3D functions"—ELECTRONICS LETTERS 14 Oct. 1999—Vol. 35 N°21. In particular, this document proposes the construction of a 3D bandpass filter by molding of a block of foam.

A process for depositing a metallic film onto a block of foam for manufacturing microwave antennas using waveguide technology is also known from the French patent document n°2780319.

The aim of the invention is to propose a process for manufacturing, from a block of synthetic foam, a microwave corrugated-horn antenna using waveguide technology, which process is designed for low-cost volume production, but which avoids the drawbacks indicated above.

The process according to the invention consists in forming the corrugations of the horn on the external surface of a block of synthetic foam and in subsequently metallizing the surface of the conformed block of foam to form the antenna. With this process, the corrugated horn can be manufactured as a single piece, which will contribute to eliminate the electrical discontinuities in the antenna.

SUMMARY OF THE INVENTION

The conformation of the external surface of the block of foam for forming the corrugations of the horn is preferably obtained by thermoforming according to a hot-press molding technique. The preform of the block of foam used for forming the horn will preferably be substantially conical.

The surface metallization of the block of foam is preferably carried out by projection or using a brush, or alternatively by dipping in a metallic bath.

The synthetic material used for the foam will preferably be a polymethacrylimide foam, marketed under the name of "ROHACELL HF", that exhibits, amongst other advantages, a good compromise between rigidity, low dielectric constant and low losses.

In addition, the external surface of several sections of the same block of foam can be conformed by hot pressing in a mold in order to form, as a single piece, a microwave antenna comprising, successively, a corrugated horn, an impedance adapter and a polarizer.

A microwave antenna polarizer using waveguide technology can be formed by insertion of two metal plates inside a circular waveguide, these two parts being disposed symmetrically with respect to one another in an axial plane of the circular waveguide. These parts are formed (length, profile), in a known manner, such that they allow the phase of a mode whose electric field E is in the plane of the metal plates to be delayed by 90° relative to a mode whose field E is perpendicular to the plane of the plates, thus obtaining a circular polarization at the exit of the polarizer, starting from a field at the entry that has a linear polarization in a plane situated at 45° from the plane of the plates and vice versa.

Two radial slots are formed by hot pressing on a cylindrical section of the block of foam, in which the corrugated horn is formed, and the surface of this cylindrical section is then metallized in order to form the polarizer. On another cylindrical section of the same block of foam, a circular groove forming a narrowing in the cross-section of the cylindrical section is formed by hot pressing and the surface of this other cylindrical section is then metallized in order to form the impedance adapter.

The fact that a single mold can be used to form by hot pressing the corrugated horn, the impedance adapter and the polarizer as a single piece contributes to reduce the manufacturing costs of the antenna. Furthermore, a microwave antenna obtained with this process benefits from a perfect electrical continuity between these various components which contributes to achieve good performance, especially as regards matching.

BRIEF DESCRIPTION OF THE DRAWINGS

The process according to the invention is described below in relation to the drawings.

FIG. 3 shows an axial cross-section of the corrugated horn obtained with the process according to the invention.

FIG. 4 illustrates very schematically a molding operation by hot pressing of a block of foam according to the invention in order to form a polarizer using waveguide technology.

FIG. 5 shows an axial cross-section of the polarizer obtained with the process according to the invention.

FIG. 6 shows an axial cross-section of a microwave antenna produced with the process according to the invention.

DESCRIPTION OF PREFERRED EMBODIMENTS

Figure 1:
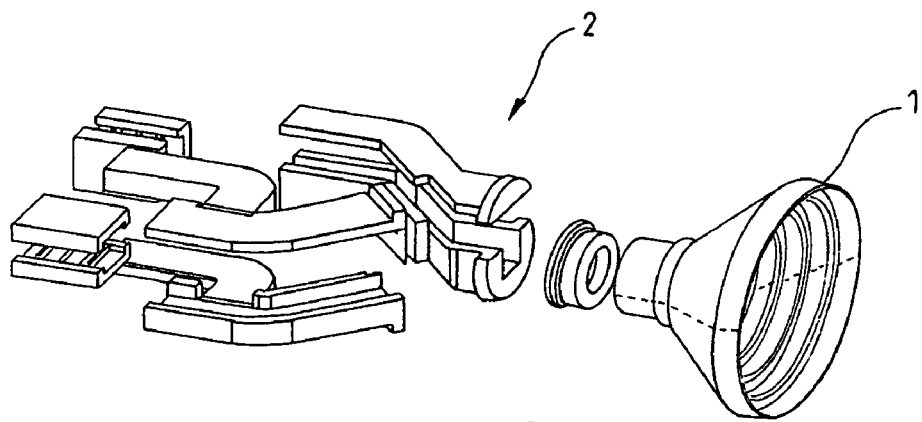
FIG. 1 shows a perspective view of a microwave antenna using waveguide technology that comprises a corrugated horn.
Figure 2:
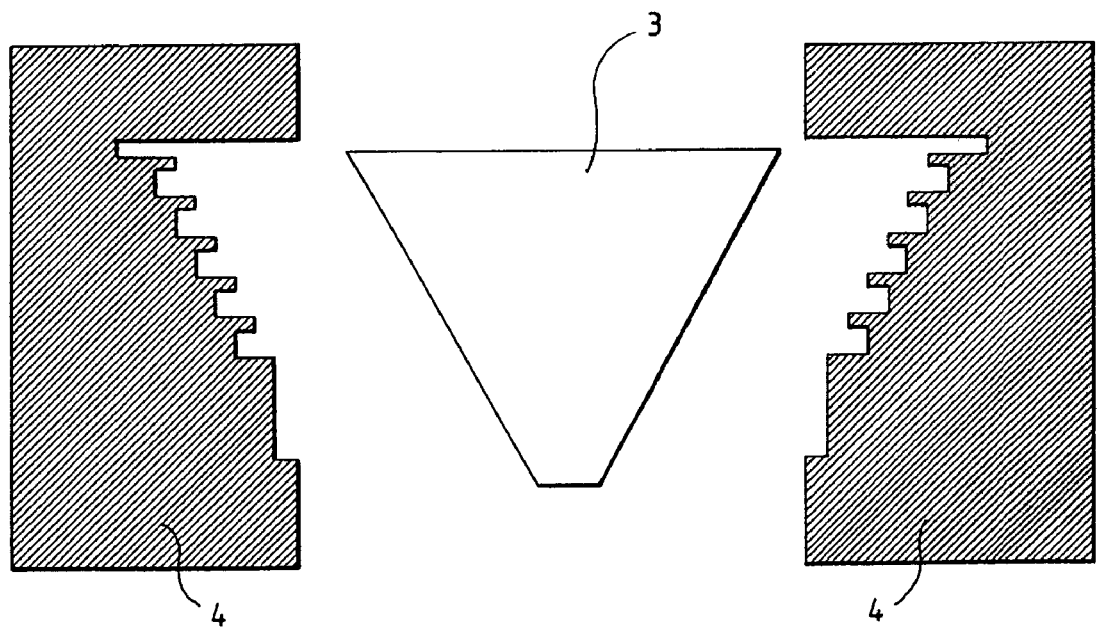
FIG. 2 illustrates very schematically a molding operation by hot pressing of a block of foam according to the invention in order to form a corrugated horn using waveguide technology as a single piece.

FIG. 2 shows a preform of substantially conical shape from a block of synthetic foam 3. This preform is conformed in a mold 4 by hot pressing in order to form a corrugated horn 5 shown in FIG. 3. Here, the synthetic foam is a polymethacrylimide foam marketed under the name of "ROHA- CELL HF"'. The corrugations 6 of the horn are formed on the external surface of the block of foam 3 by thermoforming. The surface of the conformed block of foam 3 is then metallized in order to form the corrugated horn. The heavy line 7 on the external surface of the block of foam 3 represents the metallic coating of the block of foam.

FIG. 4 shows a preform of substantially cylindrical shape from a block of synthetic foam 3'. This preform is conformed in a mold 4' by hot pressing in order to form a polarizer 8 shown in FIG. 5. The conformation consists in the formation of two radial slots 9, 10 in the block of foam 3' that are symmetrical in an axial plane of the cylindrical block of foam. The surface of the conformed block of foam 3' is then metallized as shown by the heavy line 11.

FIG. 6 now shows a microwave antenna produced using waveguide technology according to the process of the invention. The antenna comprises a corrugated horn such as 5 that is excited by a circular waveguide polarizer such as 8 together with an impedance adapter 13. The antenna is formed as a single piece from a thermoformed block of foam. More particularly, on the external surface of a first section of the block of foam of conical shape, the corrugations of the horn have been formed by thermoforming. On the external surface of a second section of the block of foam of cylindrical shape, a circular groove 12 has been formed by thermoforming in order to form the impedance adapter. On the external surface of a third section of the block of foam of cylindrical shape, two radial slots have been formed by thermoforming in order to form the polarizer. The thermoforming of the three sections of the block of foam is carried out in a single step using a single mold.

In the case where a polymethacrylimide foam is used, the preform is preheated to around 150° C. in order to soften it for insertion into the mold. Once the preform has been inserted into the mold, a suitable temperature profile is applied, for both the temperature rise phase up to 180° C. and for the temperature decrease, with a progressive application of pressure. The removal from the mold is effected at room temperature or slightly higher.

Subsequently, the surfaces of the sections of the block of foam are metallized by projection of a metallic paint of the silver type or derivative thereof, or alternatively using a brush or by dipping into a metallic bath as indicated above. The metallic coating on the surface of the block of foam (depicted with hatching) is represented by the heavy line in FIG. 6.

The invention claimed is:

1. A manufacturing process for a microwave corrugated-horn antenna comprising a horn, an impedance adapter, and a polarizer, comprising the steps of:
    thermoforming the corrugations of the horn on the external surface of a first section of a block of foam of conical shape in order to form the horn,
    thermoforming a circular groove on the external surface of a second section of the block of foam in order to form an impedance adapter, and
    thermoforming two radial slots on the external surface of a third section of the block of foam in order to form a polarizer,
    wherein the thermoforming of the three sections of the block of foam is carried out in a single step using a single mold, and
    metallizing the surfaces of the three sections of the conformed block of foam in order to form the antenna.

2. The manufacturing process of claim 1 wherein the metallization of the surface of the block of foam is carried out by a process selected amongst projection, using a brush, or dipping.

* * * * *